United States Patent [19]

Nishizawa

[11] Patent Number: 5,752,838
[45] Date of Patent: May 19, 1998

[54] TERMINAL BLOCK AND CONTROL UNIT USING SAME

[75] Inventor: Yuji Nishizawa, Tokyo, Japan

[73] Assignee: Mitsubishi Denki Kabushiki Kaisha, Tokyo, Japan

[21] Appl. No.: 632,357

[22] Filed: Apr. 10, 1996

[30] Foreign Application Priority Data

May 10, 1995 [JP] Japan ................................ 7-111611

[51] Int. Cl.$^6$ ................................................ H01R 29/00
[52] U.S. Cl. ...................... 439/52; 361/733; 439/928; 439/263
[58] Field of Search .......................... 439/709, 715, 439/716, 928, 52, 166, 170, 171, 263; 361/18, 29, 30, 56, 111, 113, 119, 733, 735

[56] References Cited

U.S. PATENT DOCUMENTS 5,598,328  1/1997  Dore ............................. 361/735

FOREIGN PATENT DOCUMENTS 0688092  12/1995  European Pat. Off. .
1117663   5/1989  Japan .

*Primary Examiner*—Neil Abrams

*Attorney, Agent, or Firm*—Sughrue, Mion, Zinn, Macpeak & Seas, PLLC

[57] ABSTRACT

A control unit including an inverter (1) and a terminal block (2) connectable to wires (8) in which an external signal for the inverter (1) is directly delivered to the inside of the inverter (1) when a first additional device (3a) is not connected to the inverter (1), and an external signal for the inverter (1) is delivered via an internal circuit in a first additional device (3a) to the inside of the inverter (1) when the first additional device (3a) is connected to the inverter (1). The terminal block (5) includes screws (14) for connection to external signal wires (8) and upper and lower sets of contact pieces (15, 16) that can be pressed together or shorted when the inverter (1) is not connected to the first additional device (3a). The first additional device includes pins (4a) having separate upper and lower contact surfaces (51a, 51b) so that when the pins are received and clamped between the contact pieces (15, 16), the current path is diverted through the additional device and then back into the inverter. A substrate (33) having separate upper and lower contact surfaces (34a, 34b) can also be used. Further additional devices may be mounted in a sequential manner with current diversion into the additional devices. The inverter and additional devices also include aligned heat radiating pins (11a).

27 Claims, 19 Drawing Sheets

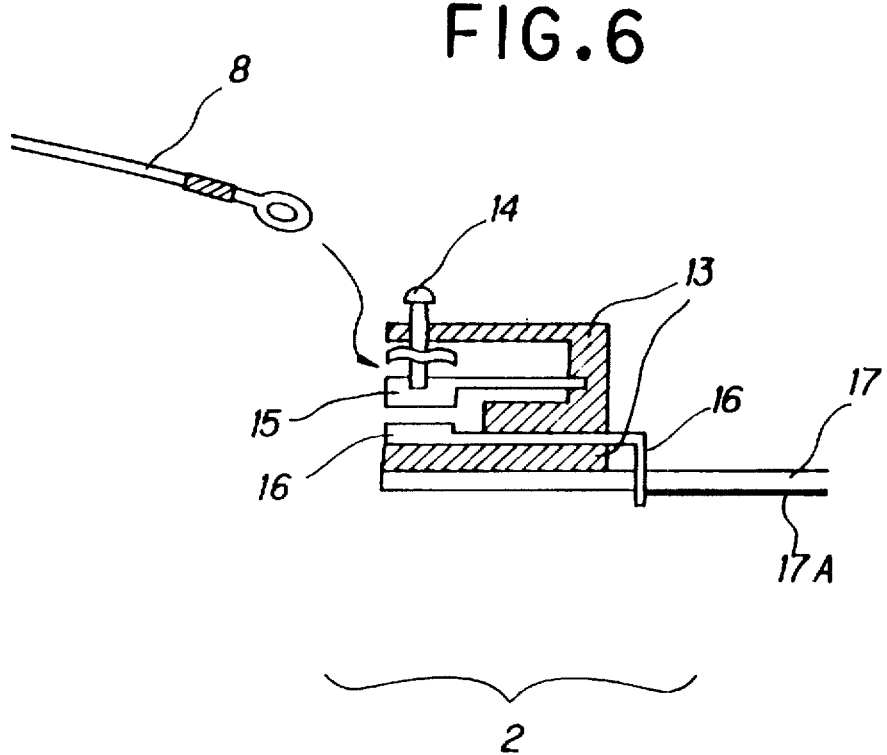

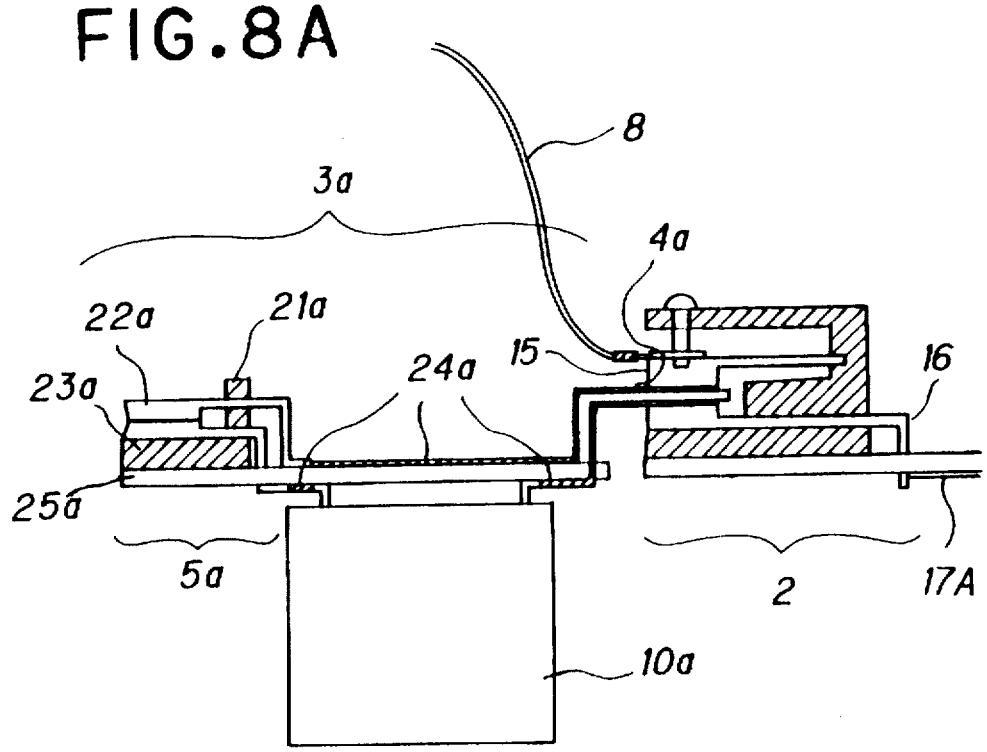
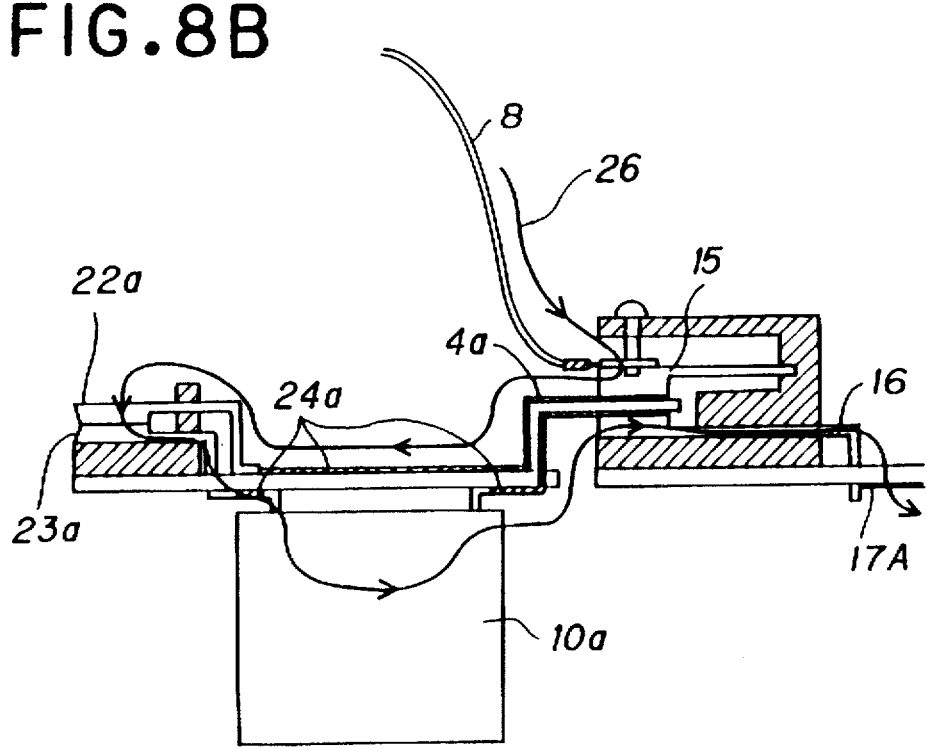

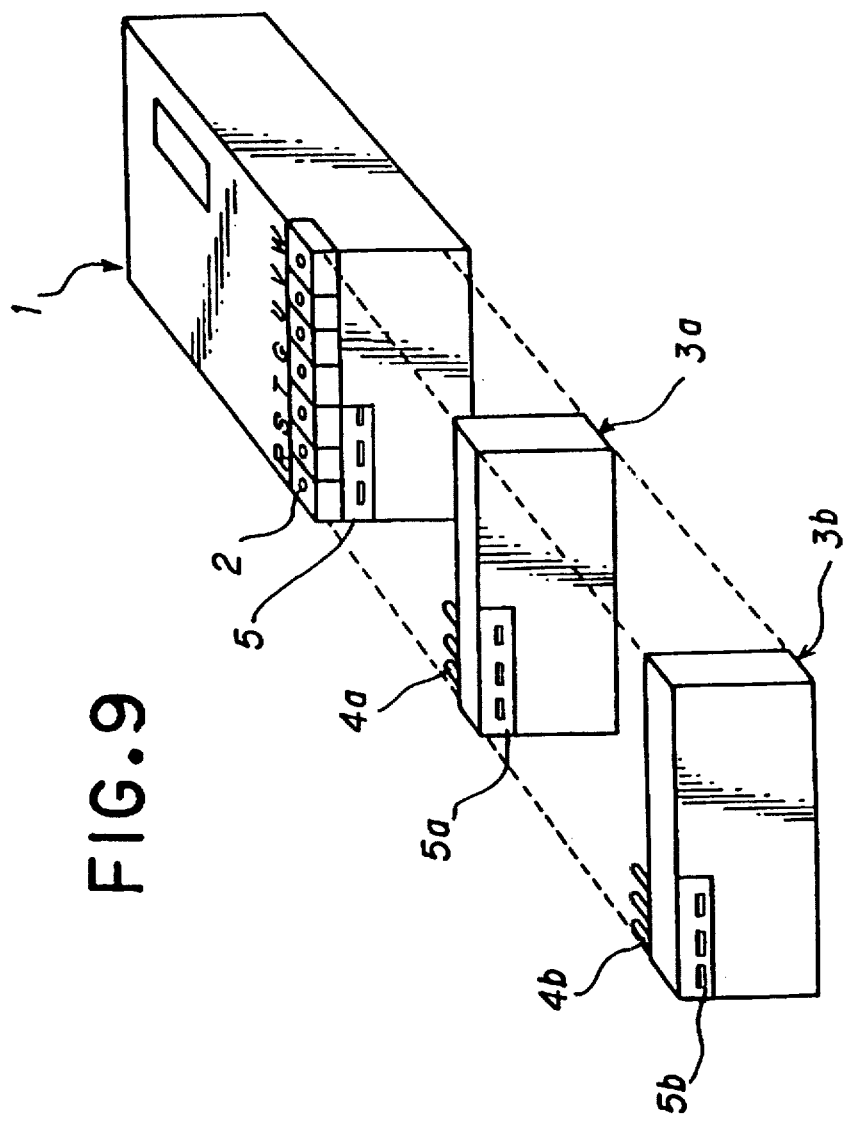

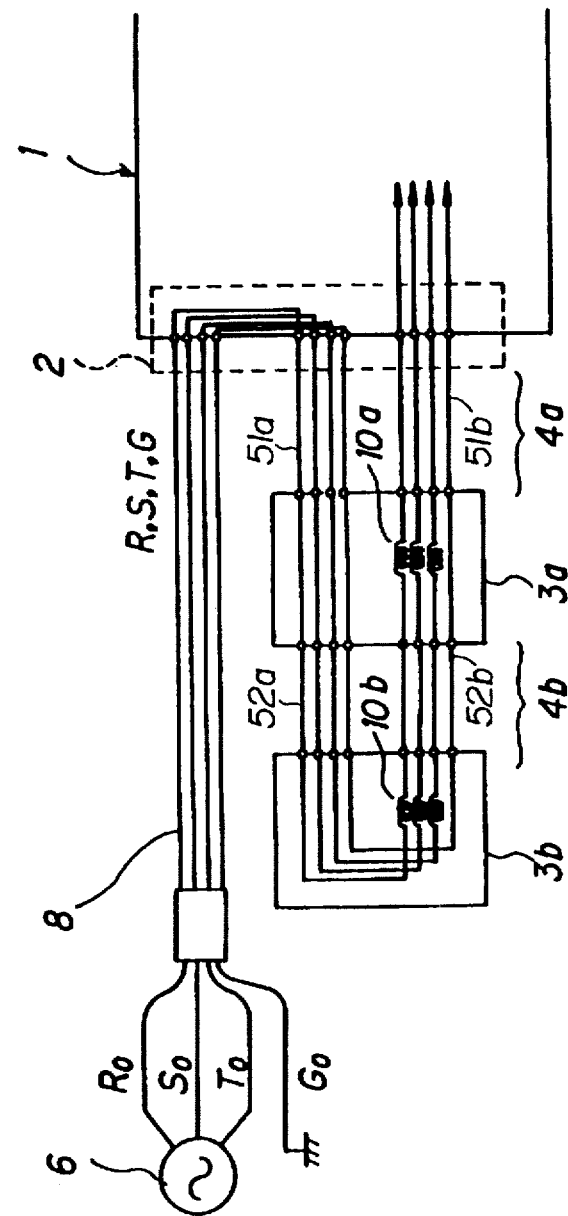

(6: AC POWER SUPPLY)

(7: EXTERNAL DEVICE)

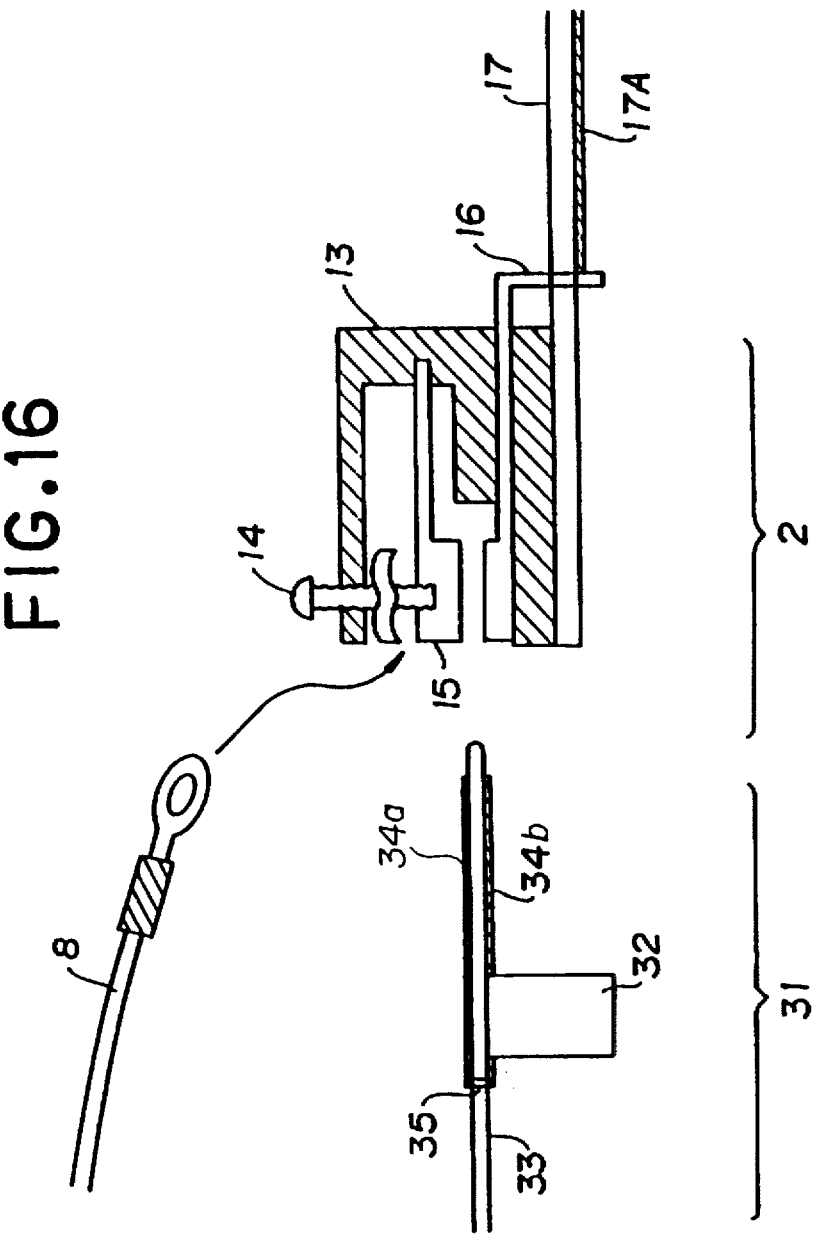

PRIOR ART
FIG.18A
PRIOR ART
FIG.18B
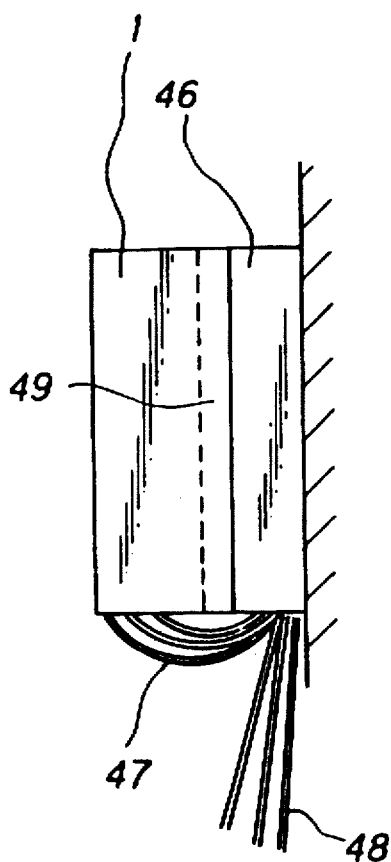
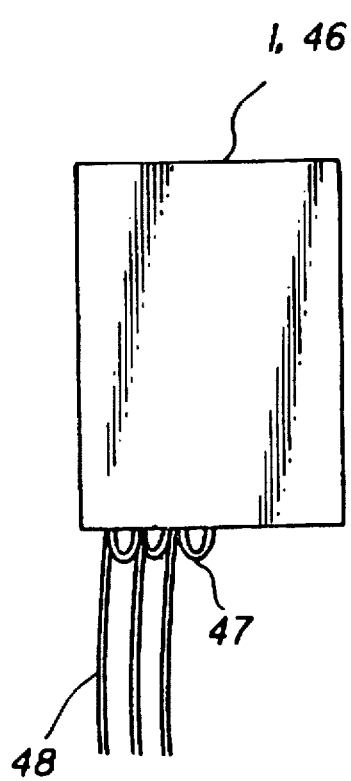

5,752,838

1

TERMINAL BLOCK AND CONTROL UNIT USING SAME

FIELD OF THE INVENTION

The present invention relates to a terminal block and control unit using the same. More particularly, the invention relates to a terminal block and control unit to which additional devices for the purpose of reducing noise, leakage current and the like can be attached in a small space and with only a small amount of work, and moreover which is not affected by electromagnetic radiation noise from a connection cable and which does not reduce the cooling efficiency of a heat-radiating fin.

BACKGROUND OF THE INVENTION

A conventional arrangement for attaching a noise filter for an inverter to an inverter is disclosed, for instance, in Japanese Patent Laid-Open Publication No. 117663/1989 entitled "Noise Filter for Inverter Device".

FIGS. 18A and 18B are block diagrams showing a noise filter disclosed in Japanese Patent Laid-Open Publication No. 117663/1989 attached to a bottom surface of an inverter, of which FIG. 18A is a side view and FIG. 18B is a front view showing the same. In these figures, designated at reference numeral 1 is an inverter, at 46 a noise filter which is attached to a bottom surface of an inverter, at 47 a cable connecting the inverter 1 to the noise filter 46, at 48 a power cable, and at 49 a heat-radiating fin.

FIGS. 19A and 19B are explanatory views used for explaining heat radiation in the case where a heat-radiating fin 49 is installed in the inverter 1. FIG. 19A is a side view of the inverter 1 as well as of the heat-radiating fin 49, while FIG. 19B is a rear view of the heat-radiating fin 49. As shown in these figures, when the heat-radiating fin is installed in the inverter 1, an air flow in the direction indicated by an arrow 50 is produced by the heat-radiating fin 49, and heat inside the inverter 1 is emitted to the outside to achieve a cooling effect.

However, when the bottom-surface-mounted type noise filter 46 and the heat-radiating fin 49 are mounted close to each other as shown in FIG. 18A, heat emission from the heat-radiating fin mounted on a bottom surface of the inverter 1 is impeded, and the cooling efficiency becomes lower.

As described above, in the conventional inverter device, if any additional device such as a noise filter is mounted to the bottom surface of the inverter, heat emission from a heat-radiating fin on the bottom surface of the inverter is impeded, and the cooling efficiency disadvantageously drops.

If any additional device is installed separately from an inverter emphasizing cooling efficiency, additional space for installing the additional device is required, so that a larger space is required for installation of the apparatus as a whole, which impedes size reduction of the apparatus. Also a connection cable is required between the inverter and an additional device, and wiring work for the connection cable is required.

Furthermore, if a long connection cable between an inverter and an additional device is required due to specific conditions at the installation site, radiation noise from the connection cable may adversely influence external devices.

SUMMARY OF THE INVENTION

It is an object of the present invention to provide a terminal block and control unit using the same to which an

2 additional device or devices for reducing noise, leakage current or the like can be attached in a small space and with a small amount of work, and moreover which is not affected by electromagnetic radiation noise from a connection cable and which does not lower the cooling efficiency of a heat-radiating fin.

The terminal block according to the present invention delivers an external signal for an inverter directly to the inside the inverter in the case where the inverter has not been connected to an additional device and also delivers an external signal for the inverter via an internal circuit in an additional device to the inside of the inverter, as a result of which it becomes possible to integrate the inverter with an additional device and eliminate a connection cable between the two.

Also the terminal block according to the present invention delivers an external signal for an inverter via an internal circuit in an additional device connected thereto in the case where the additional device has not been connected to another additional device, and also delivers an external signal for an inverter via an internal circuit in the other additional device, as well as in the connected additional device, to the inside of the inverter in the case where the additional device has been connected to the other additional device, so that it becomes possible to integrate the inverter with the additional device and thereby eliminate a connection cable between the two.

Also, as a noise filter is used as an additional device in the terminal block according to the present invention, efficient noise filtering can be realized.

Furthermore, as an overvoltage protection device can be used as an additional device in the terminal block according to the present invention, it is possible to protect the inverter from destruction due to excessive voltage.

In the control unit according to the present invention, connection between the inverter and a first additional device is made so that an external signal for the inverter is directly delivered to the inside of the inverter in the case where a first additional device is connected to the inverter, and an external signal for the inverter is delivered via an internal circuit in the first additional device to the inside of the inverter in the case where the first additional device is connected to the inverter, the inverter has a terminal block, connection between the inverter and the first additional device is carried out by fitting a short-circuiting bar to the terminal block, and the inverter and the first additional device are in the fitted closely to one another.

Assuming, for instance, that a terminal block of an inverter is a female terminal having a structure in which a first pole, connected to an external signal for the inverter, and a second pole, connected to the inside of the inverter, are contacted to each other under and elastic force in the normal state, the connection structure as described above can be realized by elastically engaging a short-circuiting bar between the first and second poles in the female terminal when the inverter and the first additional device are connected to each other. For this reason, it is possible to integrate the inverter with a first additional device, which in turn makes it possible to realize a control unit not requiring any connection cable between the two.

Also in the control unit according to the present invention, connection between an inverter and a first additional device is made so that an external signal for the inverter is directly delivered to the inside of the inverter in the case where the first additional device is not connected to the inverter, and an external signal for he inverter is delivered via an internal circuit in the first additional device to the inside of the inverter in the case where the first additional device is connected to the inverter, a terminal block having a female terminal is provided in the inverter, a male terminal and a female terminal are provided in the first additional device, connection between the inverter and first additional device are carried out by fitting a male terminal of the first additional device into a female terminal of the terminal block, and the inverter and the first additional device are held closely fitted to one another.

Assuming, for instance, that a terminal block in an inverter is a female terminal in which a first pole connected to an external signal for the inverter and a second pole connected to the inside of the interval are normally held in elastic contact, the connection structure as described above can be realized by mounting a male terminal of a first additional device in elastic contact with the female terminal of the terminal block when the inverter and the first additional device are connected to each other. For this reason it is possible to realize a control unit in which an inverter and a first additional device are integrated and a connection cable between the two is not required.

Also in the control unit according to the present invention, the control unit, a first additional device, and a second additional device are connected to each other so that an external signal for an inverter is delivered via an internal circuit in the first additional device when the second additional device is connected to the first additional device, and an external signal for the inverter and/or a signal for the first additional device are delivered via an internal circuit in the second additional device to the inside of the first additional device, and also in the control unit according to the present invention, the second additional device has a male terminal and a female terminal, connection between the first additional device and the second additional device is carried out by fitting a male terminal of the second additional device to a female terminal of the first additional device, and also the first additional device and the second additional device are kept in the closely contacted state.

For instance, if a female terminal of the first additional device has a first pole, connected to an external signal for an inverter or a signal for the first additional device, and a second pole, connected to an internal circuit in the first additional device, which are normally elastically engaged with one another, the above-described connection structure can be realized by elastically engaging a male terminal of the second additional device with the female terminal of the first additional device when the first additional device and the second additional device are connected each other, so that it is possible to realize a control unit in which the inverter, the first additional device and the second additional device are integrated, and a connection cable between the two is not required.

In the control unit according to the present invention, an inverter, an (n−1)-th additional device, an n-th additional device, and an (n+1)-th additional device are connected to each other so that an external signal for the inverter and/or a signal for the (n−1)-th additional device are delivered via an internal circuit in the n-th additional device to the inside of the (n−1) additional device when the (n+1)-th additional device is not connected to the n-th additional device, and an external signal for the inverter and/or a signal for the (n−1)-th additional device are delivered via an internal circuit in the (n+1)-th additional device to the inside of the (n−1) additional device, and also in the control unit according to the present invention, the n-th additional device has a male terminal and a female terminal, the (n+1)-th additional device has a male terminal and a female terminal, connection between the n-th additional device and the (n+1)-th additional device is made by inserting the male terminal of the (n+1)-th additional device into the female terminal of the n-th additional device, and at the same time the n-th additional device and (n+1)-th additional device are kept in the closely contacted state.

Assuming, for instance, that a female terminal of the n-th additional device has a first pole, connected to an external signal for an inverter and/or a signal for the (n−1)-th additional device, and a second pole, connected to an internal circuit in the n-th additional device, normally held in elastic contact with one another, the connection structure as described above can be realized by elastically engaging the male terminal of the (n+1)-th additional terminal with the female terminal of the n-th additional device, so that it is possible to realize a control unit in which the inverter, (n−1)-th additional device, and n-th additional device are integrated with each other and a connection cable among the components is not required.

Also in the control unit according to the present invention, a heat-radiating fin is provided on a surface on which a terminal block of an inverter is not provided, so that radiation of heat from the heat-radiating fin is not impeded by the first additional device, second additional device and/or the n-th additional device.

Also in the control unit according to the present invention, a heat-radiating fin is provided for each of the first additional device, second additional device, and n-th additional device, so that air flow from the heat-radiating fin provided in the inverter and that from heat-radiating fins provided in the first additional device, second additional device, and n-th additional device do not interfere each other and also so that radiation of heat from each heat-radiating fin is not be prevented.

Also in the control unit according to the present invention, a noise filter is used as an additional device, so that it is possible to realize an efficient noise filtering.

Also, in the control unit according to the present invention, an overvoltage protection device is used as an additional device, so that the inverter can be protected from destruction by excessive voltage.

Other objects and features of this invention will become understood from the following description with reference to the accompanying drawings.

BRIEF DESCRIPTION OF THE DRAWINGS

FIG. 6 is a cross-sectional view showing a terminal block of the control unit according to the first embodiment;

FIG. 8A is a cross-sectional view showing a cross-sectional view in the case where an external signal is supplied when the first additional device is connected to the inverter;

FIG. 8B is an explanatory view for a current path in FIG. 8A;

FIG. 9 is a general view (perspective view) showing configuration of an inverter device according to a second embodiment of the present invention;

FIG. 12 is a wiring diagram showing wiring between an inverter with the first additional device and second additional device in FIG. 11 mounted thereon and an AC power supply unit;

FIG. 16 is a cross-sectional view showing a case before a terminal block of the control unit according to the third embodiment is connected to an I/O device;

FIG. 18A is a side view showing a case where a conventional type of noise filter is mounted on a bottom surface of an inverter;

FIG. 18B is a front view showing a case where a conventional type of noise filter is mounted on a bottom surface of an inverter;

DESCRIPTION OF THE PREFERRED EMBODIMENTS

A detailed description will be given hereinafter for a terminal block and control unit using the same according to the present invention in the order of the first embodiment, second embodiment, and third embodiment, with reference to the related drawings.

Figure 1A:
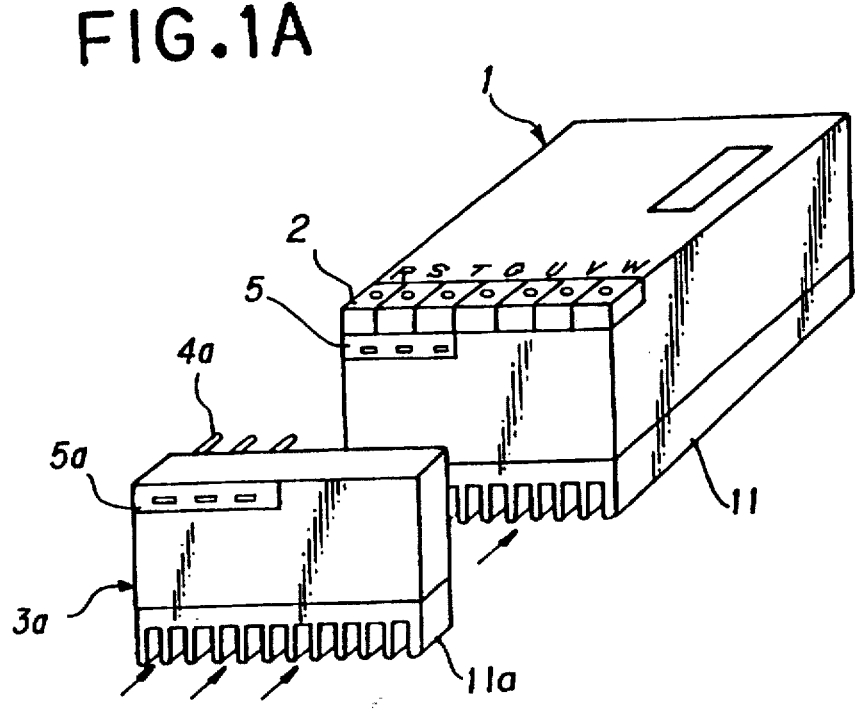
FIG. 1A is a perspective view showing the configuration of a control unit according to a first embodiment of the present invention.
Figure 1B:
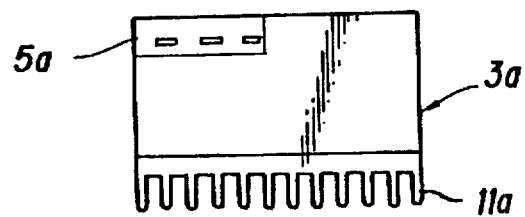
FIG. 1B is a side view showing configuration of a control unit according to the first embodiment of the present invention.

FIGS. 1A and 1B are general views showing the configuration of the control unit according to the first embodiment of the present invention, of which FIG. 1A is a perspective view thereof, while FIG. 1B is a side view showing the same. In these figures, the control unit according to this embodiment includes an inverter 1 and an additional device 3a. The additional device 3a is a noise filter, for example.

In these figures, designated at reference numeral 2 is a terminal block of the inverter 1, at 5 a female terminal of the inverter at 3a a first additional device, at 4a a male terminal of the first additional device, and at 5a a female terminal of the first additional device. In the inverter 1 is installed a heat-radiating fin 11 on a bottom surface thereof, and also the first additional device 3a is provided with a heat-radiating fin 11a.

Figure 2:
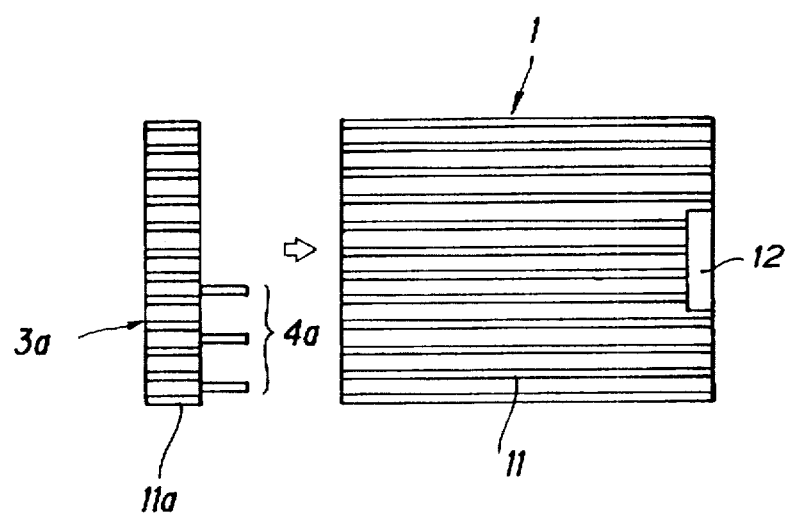
FIG. 2 is a rear view showing the inverter and a first additional device according to the first embodiment.

FIG. 2 is a rear view showing the inverter 1 and the first additional device 3a according to the present invention. As shown in this figure, on a bottom surface of the inverter 1 is provided a cooling fan 12. Also, irregularity of the heat-radiating fin 11 of the inverter 1 and the heat-radiating fin 11a of the additional device 3a are positionally adjusted, so that air flows by the heat-radiating fin 11 and by the heat-radiating fin 11a do not interfere with each other. For this reason, also the first additional device 3a is cooled by the cooling fan 12 of the inverter 1.

Figure 3:
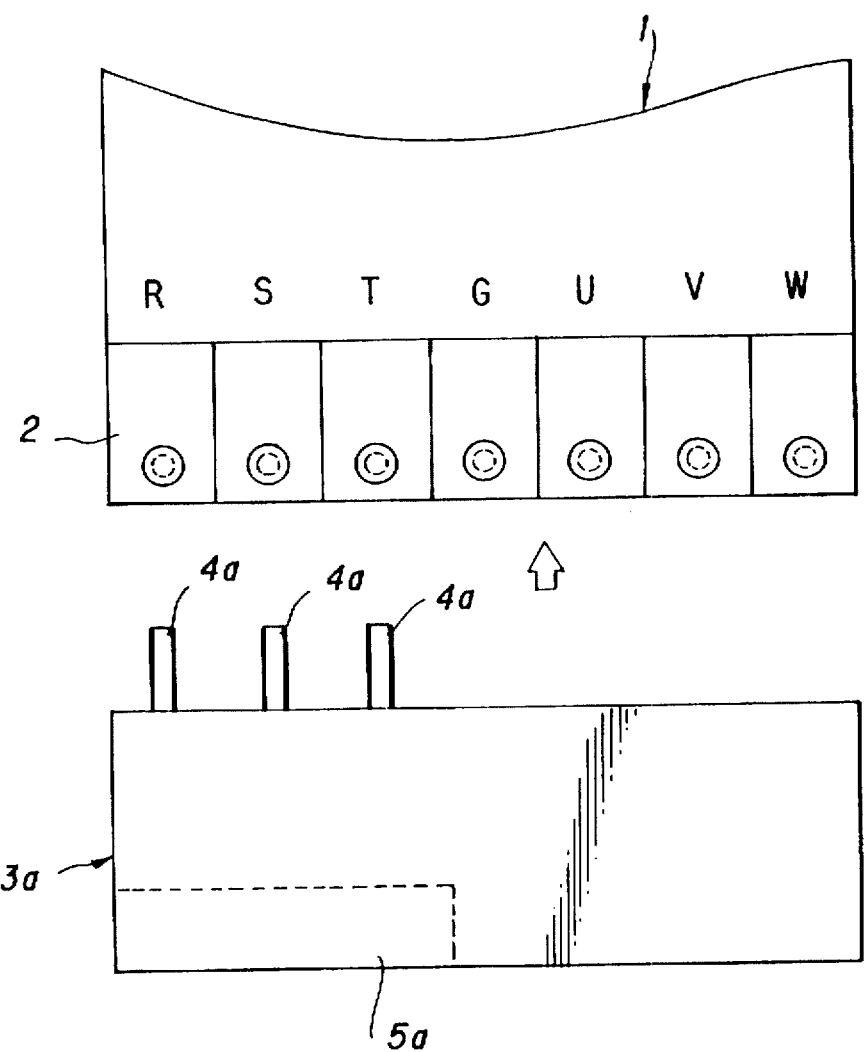
FIG. 3 is a detailed top plan view showing a portion of a terminal block in the inverter and the first additional device according to the first embodiment.

FIG. 3 is a detailed top plan view showing a terminal block 2 of the inverter 1 and the first additional device 3a according to this embodiment. As shown in the figure, on the terminal block 2 of the inverter 1 are provided R, S and T terminals connected to the side of a power supply unit. U, V and W terminals connected to the side of an external device, and a G (ground) terminal connected to the both sides. Also, a male terminal 4a of the first additional device 3a is provided with three terminals. When the inverter 1 is integrated with the first additional device 3a, the three terminals of the male terminal 4a are connected to the R, S, and T terminals, respectively.

Figure 4:
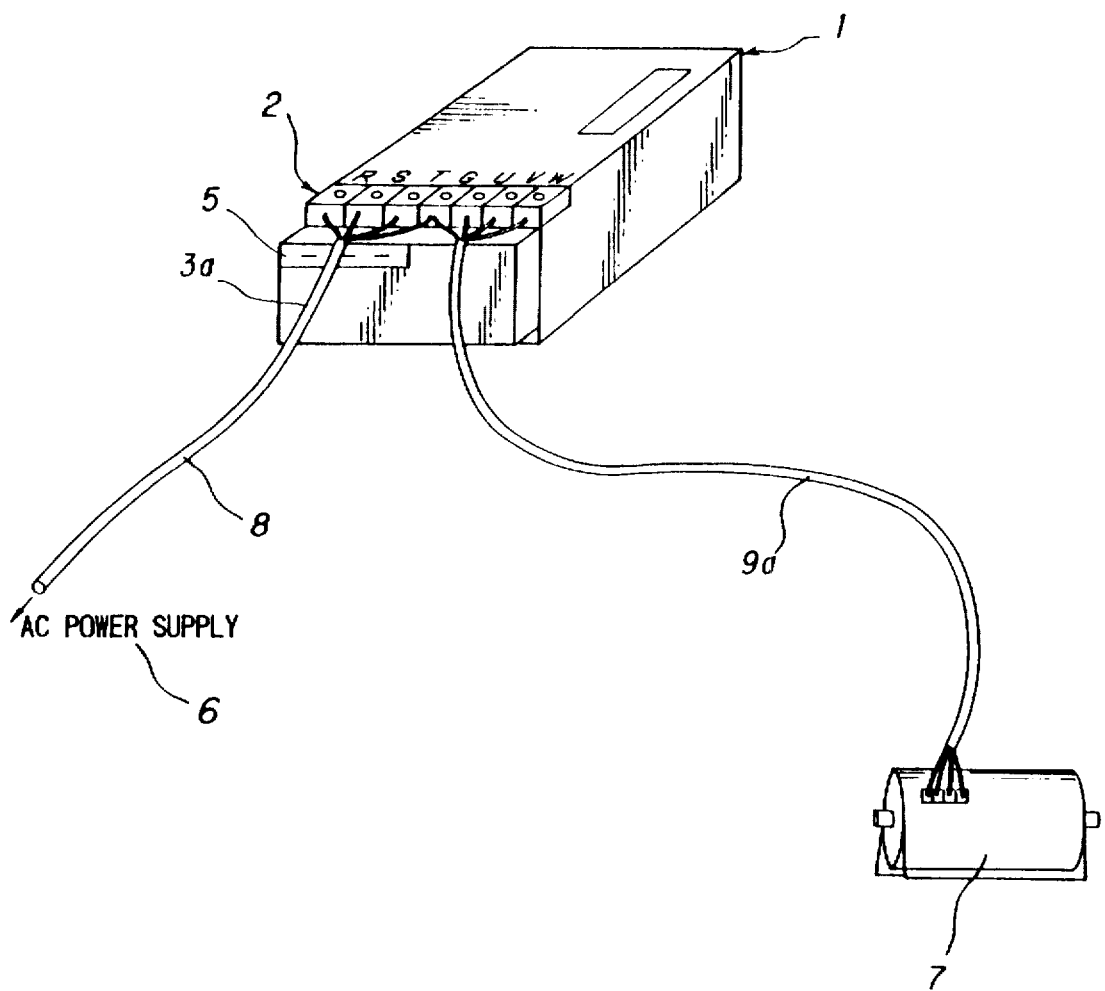
FIG. 4 is a general view showing a case where the inverter according to the first embodiment and the first additional device are integrated, and an AC power supply and an external device are connected thereto.

FIG. 4 is a general view showing a case where the inverter 1 and the first additional device 3a are integrated via an electric connection on the terminal block 2 with an AC power supply unit and an external device connected thereto. In this figure, designated at reference numeral 6 is an AC power supply unit, at 8 a cable for an AC power supply unit, at 7 an external device including a motor or the like controlled by the inverter, and at 9a a cable of length of 10 m, for example, for an external device.

Connection between the inverter 1 and the first additional device 3a is made by setting the male terminal 4a of the first additional device 3a onto the R, S, and T terminals of the terminal block 2. The inverter 1 and the first additional device 3a are close to each other when connected as shown in FIG. 4.

Figure 5:
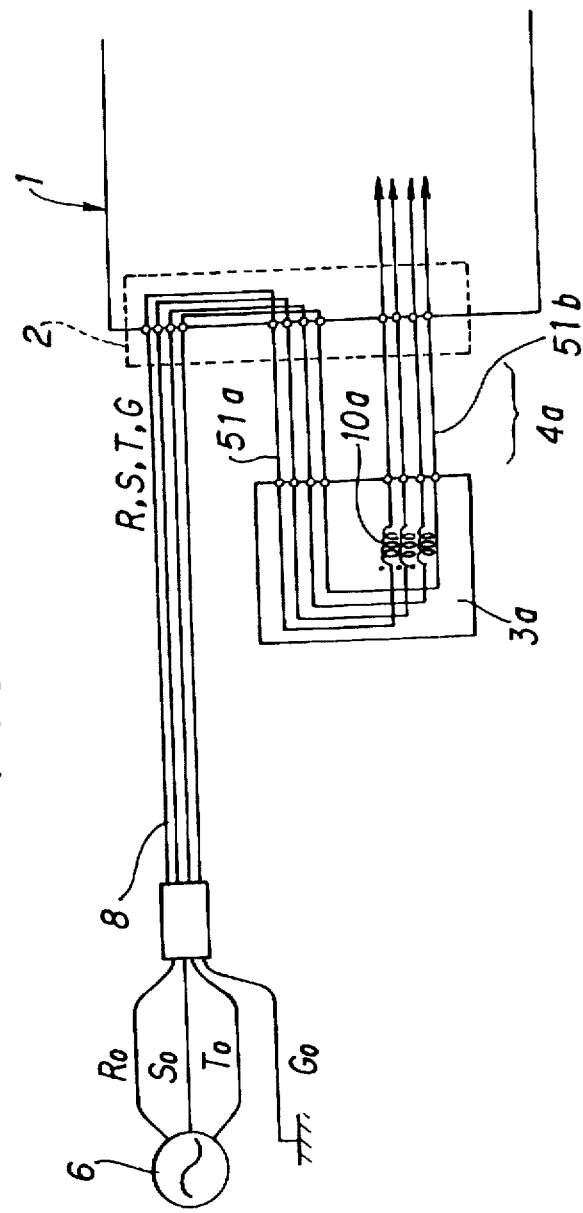
FIG. 5 is a wiring diagram showing a case where the inverter with the first additional device attached thereto is connected to an AC power supply.

FIG. 5 is a wiring diagram showing connection between the inverter 1 with the first additional device 3a attached thereto and the AC power supply unit 6 in FIG. 4. In this figure, the AC power 6 is inputted via an AC power cable 8 to the R, S, T, and G terminals of the terminal block 2 and is supplied via a terminal block 2 of the inverter 1 and the upper surface 51a of the male terminal 4a of the first additional device 3a to the first additional device 3a, and furthermore is supplied via a bottom surface 51b of the male terminal 4a to the inside of the inverter 1.

Next, a detailed description will be given relating to the construction of the connection between the inverter 1 and the first additional device 3a according to this embodiment with reference to FIGS. 6, 7A, 7B, 8A and 8B.

FIG. 6 is a cross-sectional view showing the terminal block 2 of the inverter 1 according to this embodiment. In this figure, reference numerals 15 and 16 indicate upper and lower contact pieces, such as plate springs, each made of electrically conductive material. Also, designated at 14 is a screw, at 13 an insulating body supporting the screw 14 and upper and lower contact piece 15 and 16, at 17 a substrate of the inverter 1, and at 17A a conductive pattern on the substrate 17.

Namely, in the construction for making connection between the inverter 1 and the first additional device 3a according to this embodiment, the terminal block 2 of the inverter 1 is a female terminal to which a first electrode (upper contact piece 15) for making connection with an external signal (the AC power cable 8) and a second electrode (lower contact piece 16) for making connection with the inside of the inverter 1 (conductive pattern 17A) are usually contacted making use of the elasticity or the like thereof, and the male terminal 4a of the first additional device 3a is set against the elasticity or the like of the female terminal of the terminal block 2 when connecting the inverter 1 to the first additional device 3a. It should be noted that in FIG. 6 the female terminal of the terminal block 2 is not of an elastic construction but the functional equivalence is realized with the screw 14.

With this construction, when the first additional device 3a is not connected to the inverter 1, an external signal for the inverter 1 is directly delivered to the inside of the inverter 1, and if the first additional device 3a is connected to the inverter 1, an external signal for the inverter 1 is delivered via an internal circuit of the first additional device 3a to the inside of the inverter 1.

Figure 7A:
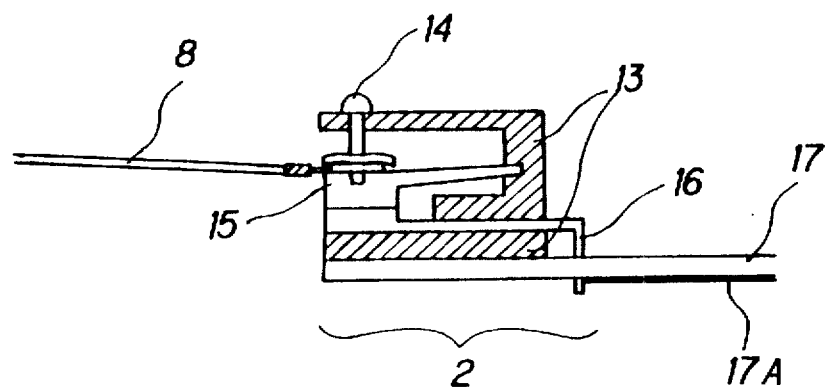
FIG. 7A is a cross-sectional view showing a terminal block in the case where an external signal is supplied to the inverter when the first additional device is not connected to the inverter.
Figure 7B:
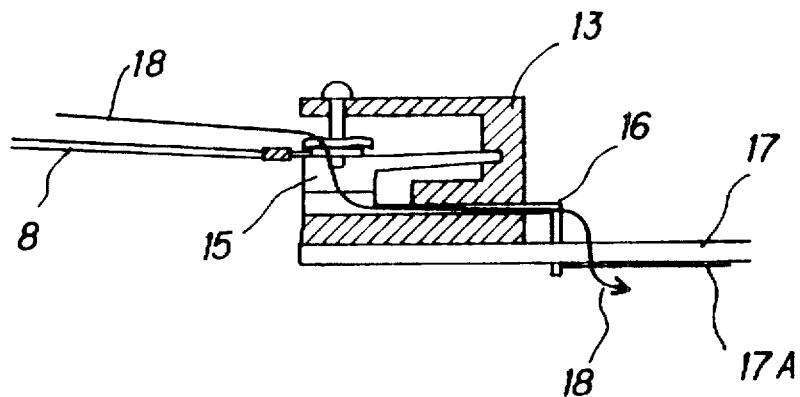
FIG. 7B is an explanatory view for a current path in FIG. 7A.

FIG. 7A is a cross-sectional view showing the terminal block 2 when an external signal (AC power cable 8) is connected to the inverter 1 in the case where the first additional device 3a is not connected to the inverter 1, and FIG. 7B is an explanatory view for a current path shown in FIG. 7A.

Namely, in FIG. 7A, when a terminal for the AC power cable 8 supply unit is fixed with the screw 14 to the upper contact piece 15 and the screw 14 is tightened, the two sheets of the upper and lower contact pieces, that is, plate springs 15 and 16, come closer and are electrically connected to each other. The current path then is as shown, namely, a current path 18 shown in FIG. 7B. That is, AC power supplied from the AC power cable 8 is supplied via the two sheets of upper and lower contact pieces (plate springs) 15 and 16 provided close to each other and through the conductive pattern 17A on the substrate 17 of the inverter 1 to the inside of the inverter 1.

FIG. 8A is a cross-sectional view showing the terminal block 2 and the first additional device 3a when an external signal (AC power cable 8) is connected to the inverter 1 in the case where the inverter 1 is connected to the first additional device 3a, while FIG. 8B is an explanatory view for the current path shown in FIG. 8A.

In FIG. 8A, the first additional device 3a is provided with the male terminal 4a, a female terminal 5a, a substrate 25a, and a common mode reactor 10a. The male terminal 4a is connected to one side of the substrates 25a of the first additional device 3a, while a female terminal 5a is formed in another side of substrate 25a. The female terminal 5a is composed of two sheets of electrically conductive contact pieces 22a, 23a, and an insulating body 21a fixing the upper contact pieces 22a and 23a. It should be noted that on the substrate 25a of the first additional device 3a is formed a conductive pattern 24a.

The current path in this case is the path 26 shown in FIG. 8B. Namely, AC current supplied from the AC power cable 8 is supplied via the contact piece 15 of the inverter 1, the upper surface of the male terminal 4a of the first additional device 3a, conductive pattern 24a, contact pieces 22a and 23a, and also via the conductive pattern 24a, common mode reactor 10a, conductive pattern 24a and the lower surface of the male terminal 4a, and furthermore via the contact piece 16 of the inverter 1 and the conductive pattern 17A of the substrate 17 to the inside of the inverter 1.

As described above, in the control unit according to this embodiment, the inverter 1 and the first additional device 3a are connected and integrated with each other on the terminal block 2, so that the space required for installation of the control unit as a whole becomes substantially smaller as compared to that when the inverter 1 is connected to an additional device with a cable. Also, the cost for a connection cable and work for connection become unnecessary, and in addition the size of the control unit as a whole is minimized.

Also, a connection cable between the inverter 1 and the additional device 3a is not required, so that electromagnetic radiation noise from a connection cable is suppressed. Furthermore, air flows generated by the heat-radiating fin 11 of the inverter 1 and by the heat-radiating fin 11a of the first additional device 3a flow in a coordinated way, so that heat emission from heat-radiating fins is not impeded as in the conventional approach.

FIG. 9 is a general view (perspective view) showing the configuration of a control unit according to the second embodiment of the present invention. In this figure, the control unit according to this embodiment is composed of an inverter 1 and two additional devices 3a and 3b.

In this figure, designated at reference numeral 2 is a terminal block of the inverter 2, at 3a a first additional device, at 4a a male terminal of the first additional device, at 5a a female terminal of the first additional device, at 3b a second additional device, at 4b a male terminal of the second additional device, and at 5b a female terminal of the second additional device. Although not shown in this figure, as in the first embodiment, a heat-radiating fin may be provided on the bottom surface of the inverter 1, and heat-radiating fins may also be provided on the first additional device 3a and second additional device 3b.

Figure 10:
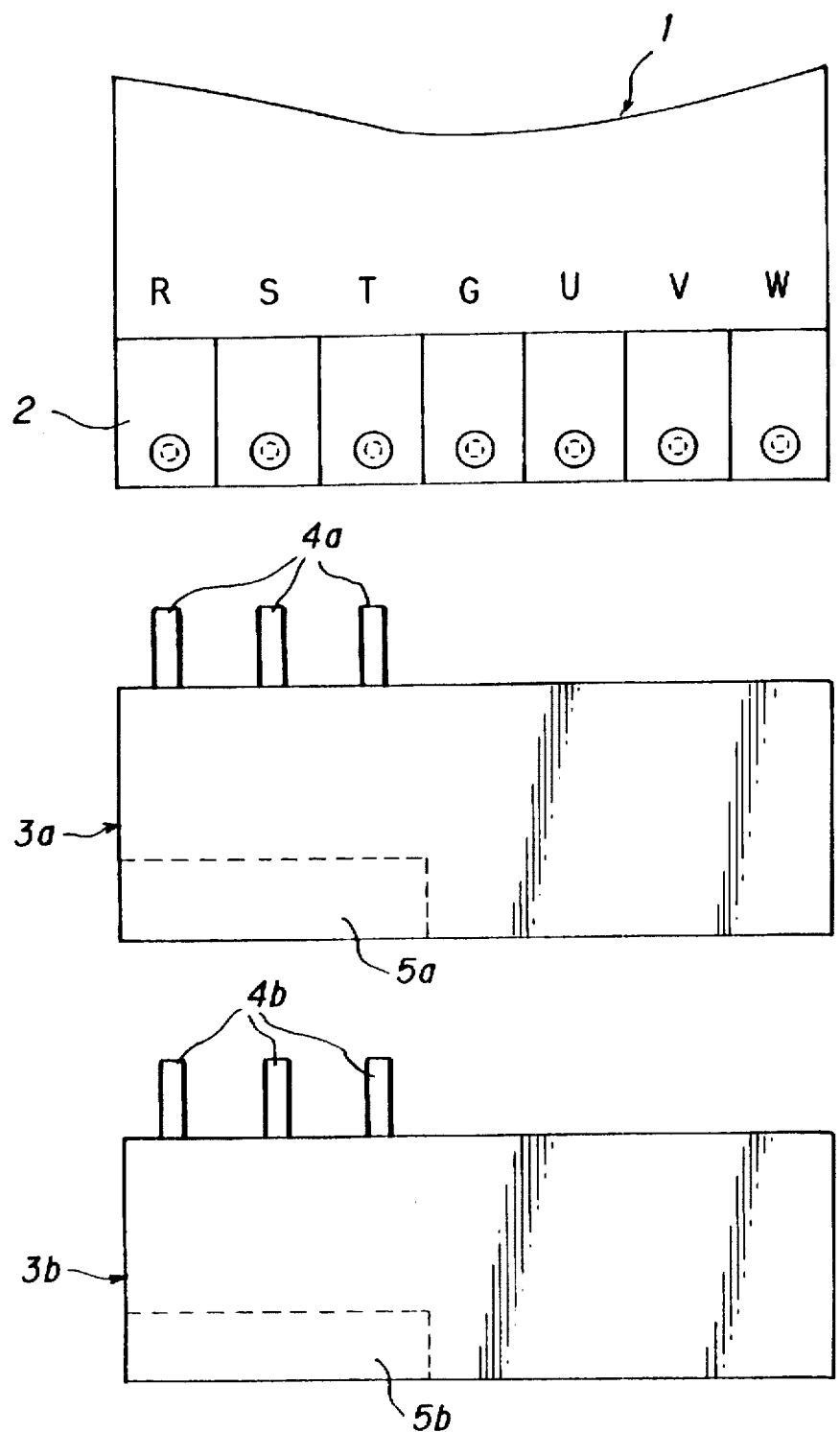
FIG. 10 is a detailed top plan view showing a terminal block of the inverter, first additional device, and second additional device according to the second embodiment.

FIG. 10 is a detailed top plan view of the terminal block 2 of the inverter 1, first additional device 3a, and second additional device 3b according to this embodiment. As in case of the first embodiment, the terminal block 2 of the inverter 1 is provided with R, S, and T terminals, each connected to the side of a power supply unit, U, V, and W terminals, each connected to an external device, and a G (ground) terminal connected to both sides.

The male terminal 4a of the first additional device 3a and the male terminal 4b of the second additional device 3b are provided with three terminals, respectively. When the inverter 1, first additional device 3a, and second additional device 3b are integrated into a single body, the three terminals on the male terminal 4a of the first additional device 3a are connected to the R, S, and T terminals of the terminal block 2, respectively, while the three terminals on the male terminal 4b of the second additional device 3b are connected to the female terminal 5a of the first additional device 3a.

Figure 11:
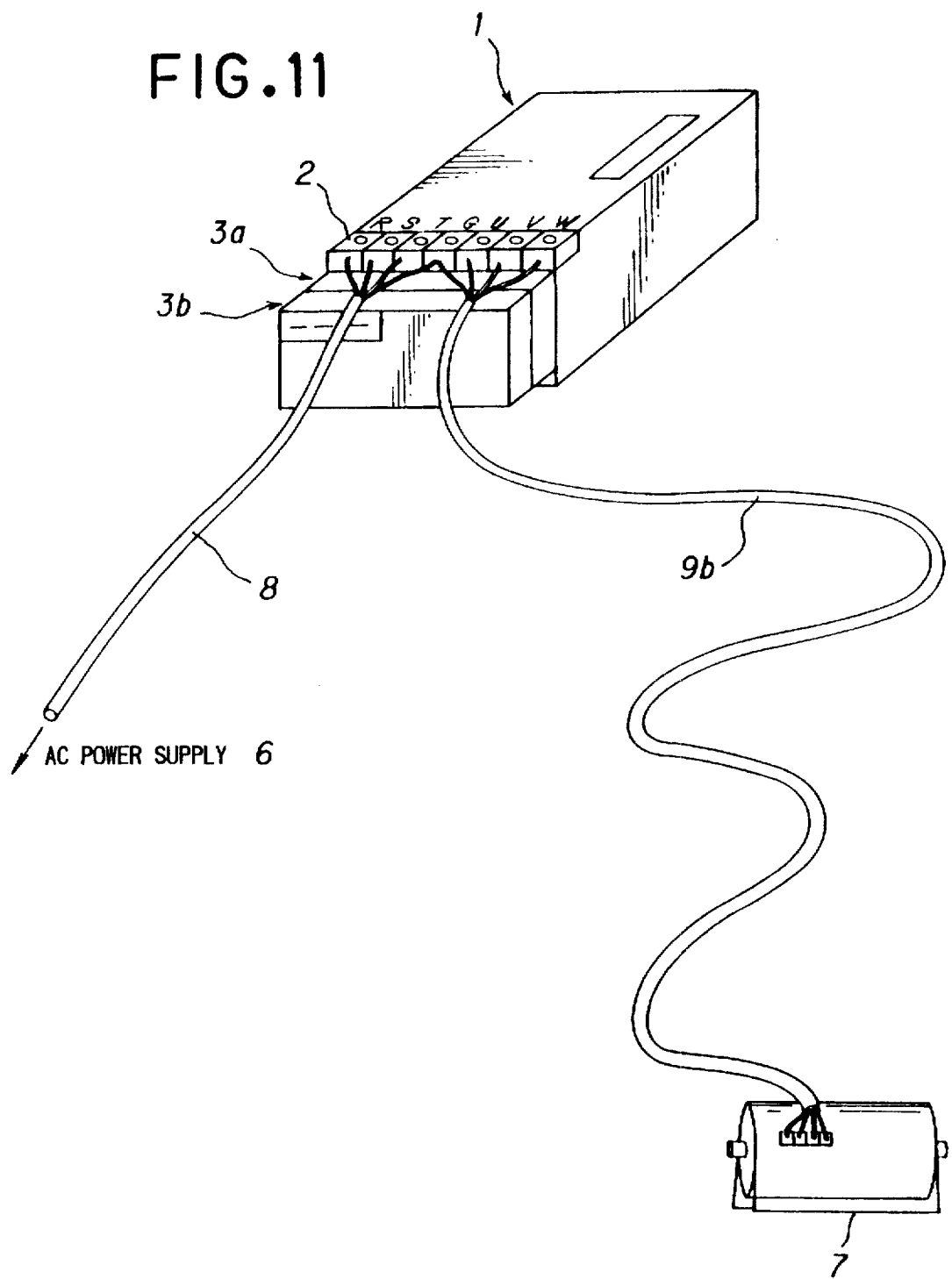
FIG. 11 is a general view showing a case where the inverter according to the second embodiment, first additional device, and second additional device are integrated with an AC power supply and an external device connected thereto.

FIG. 11 is a general view showing a case where the inverter 1, first additional device 3a, and second additional device 3b are integrated by way of electric connection with the terminal block 2 and male and female terminals of additional devices to each other with an AC power supply unit and an external device connected thereto. In this figure, designated at 6 is an AC power supply unit, at 8 a cable for AC power, at 7 an external device, and at 9b a cable of length of 100 m, for example, for connection with the external device.

Connection between the inverter 1 and the first additional device 3a is made by setting the male terminal 4a of the first additional device 3a onto the R, S, and T terminals of the terminal block 2 with the inverter 1 and the first additional terminal 3a provided closer to each other when connected, and furthermore connection between the first additional device 3a and the second additional device 3b is made by setting the male terminal 4b of the second additional device 3b onto the female terminal 5a of the first additional device 3a with the first additional device 3a and second additional device 3b provided close to each other when connected.

FIG. 12 is a wiring diagram showing connection between the inverter 1 with the first additional device 3a and second additional device 3b attached thereto and the AC power supply unit 6. In this figure, AC power 6 is inputted via the AC power cable 8 to the R, S, T, and G terminals of the terminal block 2, and is supplied via the terminal block 2, the upper surface 51a of the female terminal 4a, first additional device 3a, and the upper surface 52a the male terminal 4b to the second additional device 3b. Furthermore, AC power is supplied via the common mode reactor 10b inside the second additional device 3b and the lower surface 52b the male terminal 4b to the first additional device 3a, and finally via the common mode reactor 10a inside the first additional device 3a and the lower surface 51b of the male terminal 4a to the inside of the inverter 1.

Figure 13A:
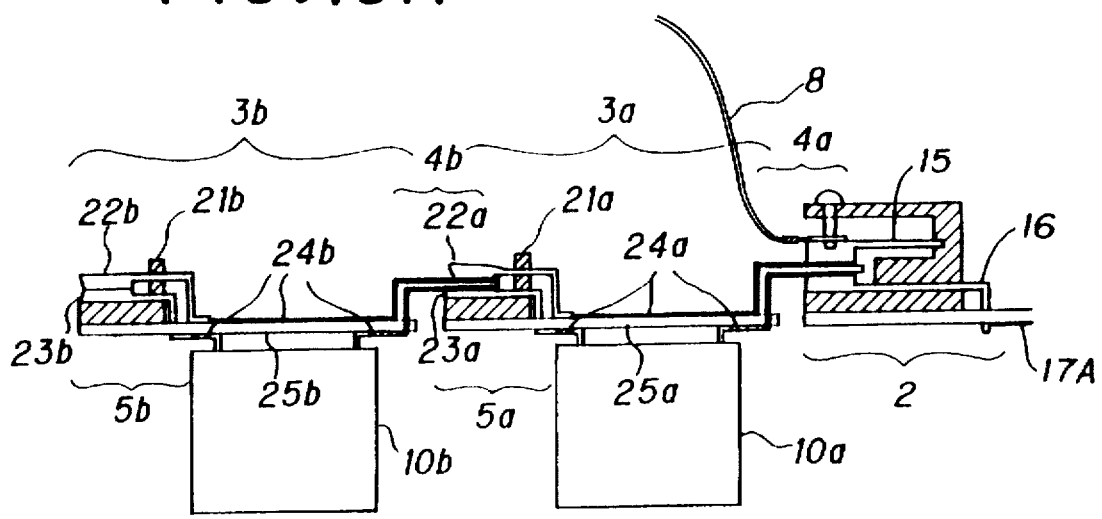
FIG. 13A is a cross-sectional view showing a terminal block with an external signal for the inverter connected thereto, first additional device and second additional device.
Figure 13B:
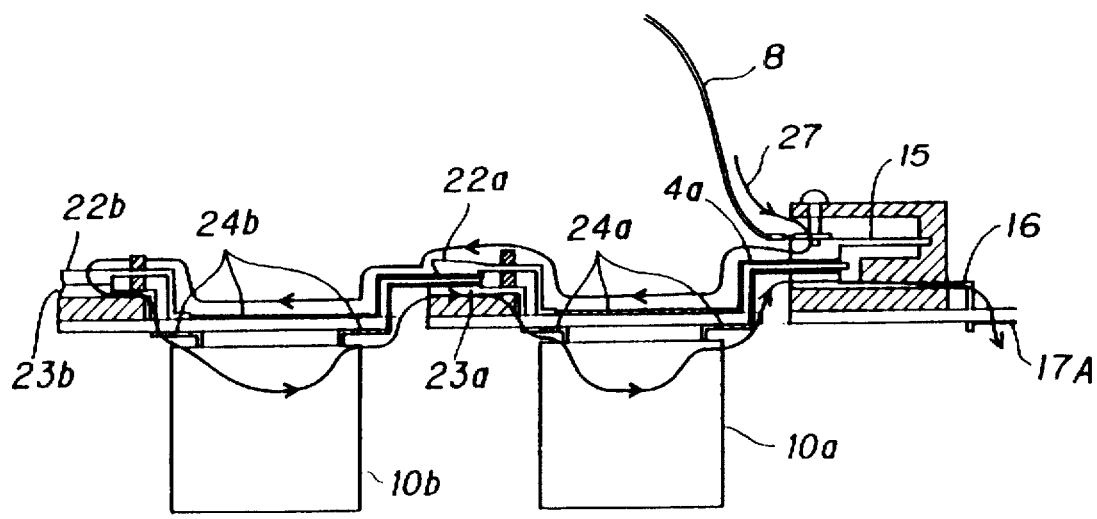
FIG. 13B is an explanatory view for the current path in FIG. 13A.

A detailed description will be given relating to the connection structure between the inverter 1, the first additional device 3a and second additional device 3b according to this embodiment. FIG. 13A is a cross-sectional view showing the terminal block 2 when an external signal (an AC power cable 8) is connected to the inverter 1, the first additional device 3a and the second additional device 3b, and FIG. 13B is an explanatory view for a current path in FIG. 13A.

In FIG. 13A, the construction of the terminal block 2 and that of the first additional device 3a are the same as those in the first embodiment. The second additional device 3b is provided with the male terminal 4b, female terminal 5b, substrate 25b, and common mode reactor 10b, the male terminal 4b is connected to one of the substrates 25b of the second additional terminal 3b, and the female 5b is formed on another side of substrate 25b. Also, the female terminal 5b is composed of two sheets of electrically conductive contact pieces 22b, 23b, and an insulating body 21b fixing the contact pieces 22b and 23b. It should be noted that a conductive pattern 24b is formed on the substrate 25b of the second additional device 3b.

Namely, the connection structure between the inverter 1 and the first additional device 3a is the same as that in the first embodiment. In the connection structure between the first additional device 3a the second additional device 3b, the female terminal 5a of the first additional device 3a is a female terminal to which a first electrode (upper contact piece 22a) for connection with an external signal (an AC power cable 8) (or a signal for the first additional device 3a) and a second electrode (lower contact piece 23a) for connection with an internal circuit (conductive pattern 24a and the common mode reactor 10a) of the first additional device 3a are usually contacted making use of the elasticity or the like thereof, and when the first additional device 3a and the second additional device 3b are connected to each other, the male terminal of the second additional device 3b is set against the elasticity of the male terminal 5a of the first additional device 3a.

With this construction, when the second additional device 3b is not connected to the first additional device 3a, the external signal 8 for the inverter 1 is delivered via an internal circuit of the first additional device 3a to the inside of the inverter 1, and when the second additional device 3b is connected to the first additional device 3a, an external signal (or a signal for the first additional device 3a) is delivered via an internal circuit of the second additional device 3b to the inside of the first additional device 3a.

The current path then is the current path 27 shown in FIG. 13B. Namely, AC current supplied from the AC power cable 8 is supplied via the contact piece 15, the upper surface of the male terminal 4a of the first additional device 3a, conductive pattern 24a, contact piece 22a, the upper surface of the male terminal 4b of the second additional device 3b, conductive pattern 24b, and contact pieces 22b and 23b, and via the conductive pattern 24b, common mode reactor 10b, conductive pattern 24b, the lower surface of the male terminal 4b, and contact piece 23a of the first additional device 3a, and furthermore via the conductive pattern 24a, common mode reactor 10a, conductive pattern 24a and the lower surface of the male terminal 4a, and still furthermore via the contact piece 16 of the inverter 1 and conductive pattern 17A on the substrate 17 to the inside of the inverter 1.

Figure 14:
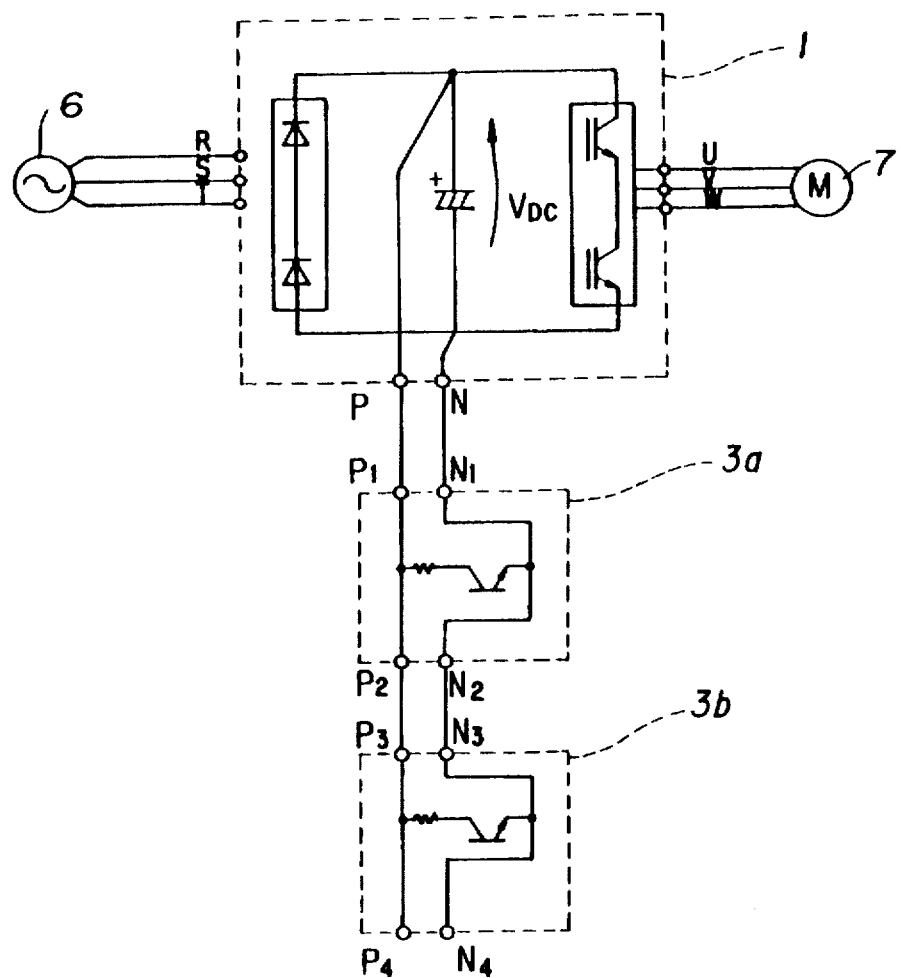
FIG. 14 is an electric circuit diagram showing a case where the first additional device and the second additional device are overvoltage protection devices.

FIG. 14 is an electric connection diagram showing the electric connection between the first additional device 3a, second additional device 3b, inverter 1, AC power supply unit 6, and external device 7 when the first additional device 3a and the second additional device 3b are first and second overvoltage protection devices, respectively. It should be noted that the external device 7 is assumed to be a motor herein.

When the motor 7 is decelerated, regenerative energy returns from the motor 7 to the inverter 1, so that the DC bus voltage $V_{DC}$ is raised. However, if the DC bus voltage $V_{DC}$ surpasses a certain level, the inverter 1 can be damaged or destroyed. The overvoltage protection device is a device to protect the inverter 1 from damage due to an excessive voltage by consuming the regenerative energy in a resistance.

The quantity of regenerative energy varies according to a load to the motor 7 and the time required for decelerating the motor 7, so that the number of overvoltage protection devices should be set according to usage. In this embodiment, two additional devices 3a and 3b are attached to the inverter 1, but third, fourth, and more additional devices can be attached thereto according to necessity.

As described above, in the control unit according to this embodiment, the inverter 1 and the first additional device 3a are integrated through the terminal block 2 into a single body, and also the first additional device 3a and the second additional device 3b are connected with male and female terminals into a single body, so that, as compared to a case where the inverter 1 and a plurality of additional devices are connected to each other with cables, the space required for the control unit as a whole can substantially be reduced. Also the cost for connection cables and the work needed for making the connections become unnecessary, and in addition the size of the control unit as a whole is minimized. Furthermore, cables for connection between the inverter 1, first additional device 3a, and second additional device 3b are not necessary, so that electromagnetic radiation noise from a connection cable is eliminated.

In the conventional approach, an internal circuit (such as an impedance in the form of a common mode reactor) of an additional device must be changed according to the length of the cable between the inverter 1 and the external device 7 (such as a motor), but in the present case it is only necessary to increase or reduce the number of one type of additional device. For this reason it is not necessary to prepare many types of additional devices, so that preparatory work for changing the design is simplified with costs reduced. Furthermore, the wiring from the AC power supply unit for the inverter 1 is not required to be changed even when an additional device is added or removed later, so that various advantages such as simplification of the work are attained.

Figure 15:
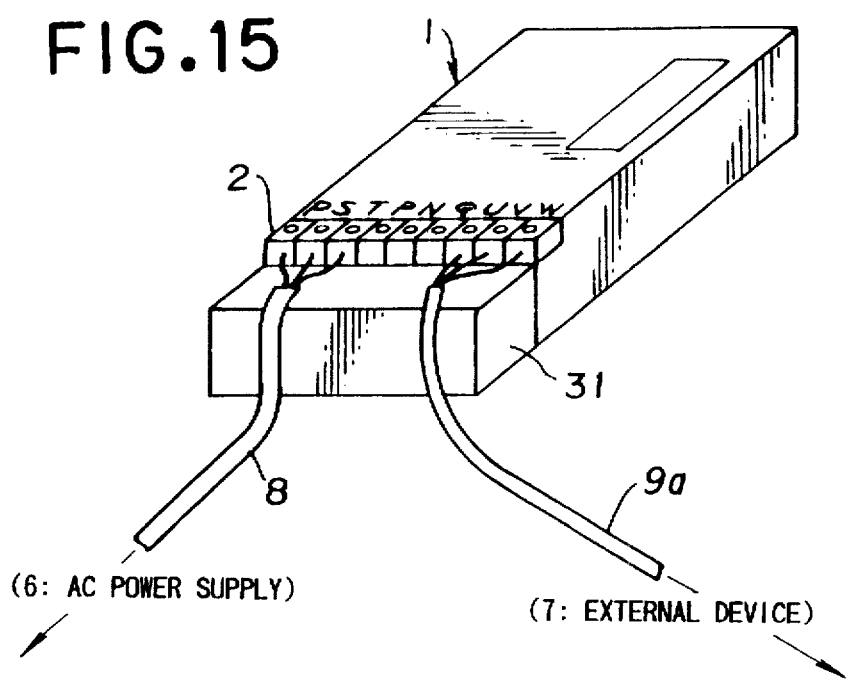
FIG. 15 is a general view showing the configuration of a control unit according to a third embodiment of the present invention.

FIG. 15 is a general view showing the configuration of a control unit according to the third embodiment of the present invention. In this figure, the control unit according to this embodiment is composed of the inverter 1 and one unit of I/O device 31.

In FIG. 15, the inverter 1 and an I/O device 31 are integrated into a single body by way of electric connection through the terminal block 2 of the inverter 1. The figure shows the appearance when an AC power supply unit is connected to an external device. In this figure, designated at reference numeral 8 is a cable for an AC power supply unit, and 9a a cable for an external device.

Next, a detailed description will be given of the connection structure between the inverter 1 according to this embodiment and the I/O device 31. FIG. 16 is a cross-sectional view showing the terminal block 2 of the inverter 1 and the I/O device 31 before they are connected to each other. In this figure, the terminal block 2 is composed of, as in the first embodiment, contact pieces 15 and 16 each made of an electrically conductive material, a screw 14, and an insulating body 13 supporting the contact pieces 15 and 16. Reference numeral 17 indicates the substrate of the inverter 1, while reference numeral 17A indicates a conductive pattern on the substrate 17.

In FIG. 16, the I/O device 31 includes a substrate 33 and a part 32 of the I/O device. conductive patterns are formed on the upper surface 34a and the lower surface 34b, of the substrate 33, and the two conductive patterns are connected to each other via a through-hole 35.

Namely, in the connection structure between the inverter 1 according to this embodiment and the first additional device 3a, the terminal block 2 of the inverter 1 is a female terminal to which a first electrode (contact piece 15) for connection with an external signal (AC power cable 8) and a second electrode (contact piece 16) for connection with inside of the inverter 1 (conductive pattern 17A) are always contacted making use of the elasticity or the like thereof, and when the inverter 1 and the I/O device 31 are connected to each other, the substrate 33 having upper and lower contacts surfaces 34a, 34b is set against the elasticity or the line of the female terminal of the terminal block 2. It should be noted that in FIG. 16 the female terminal of the terminal block 2 is not formed of an elastic construction but the functional equivalence is realized with the screw 14.

With this construction, when the I/O device 31 is not connected to the inverter 1, an external signal for the inverter 1 is directly delivered to the inside of the inverter 1, and when the I/O device 31 is connected to the inverter 1, an external signal for the inverter 1 is delivered via an internal circuit (parts 32 of the I/O device) of the I/O device to the inside of the inverter 1.

Figure 17B:
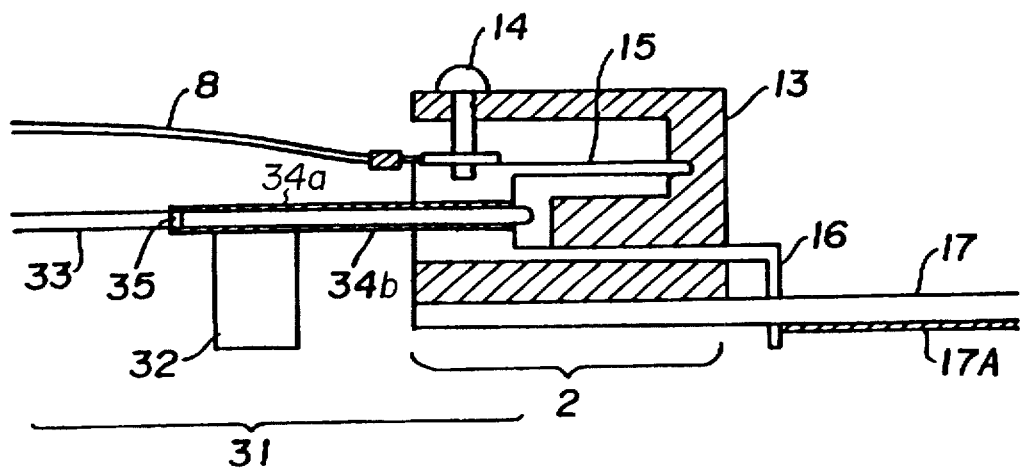
FIG. 17B is an explanatory view for a current path in FIG. 17A.
Figure 17A:
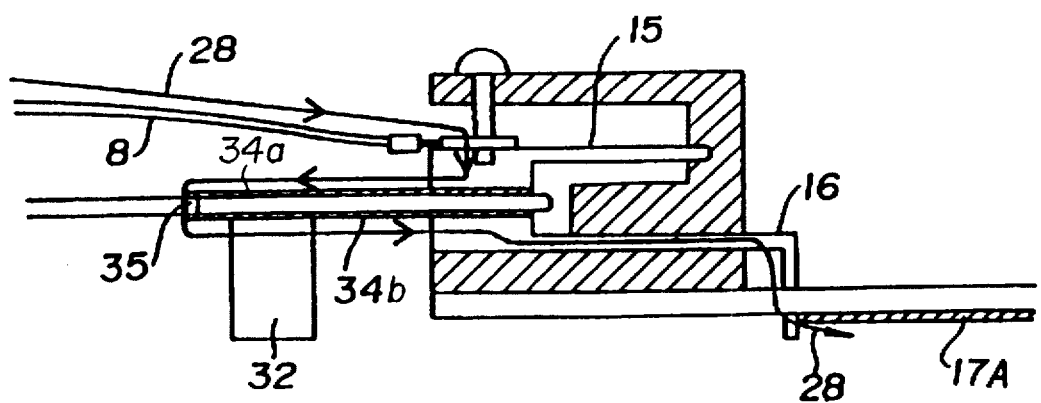
FIG. 17A is a cross-sectional view showing a terminal block and an I/O device when an external signal is connected to the inverter in the case where the I/O device is connected to the inverter.
Figure 19A:
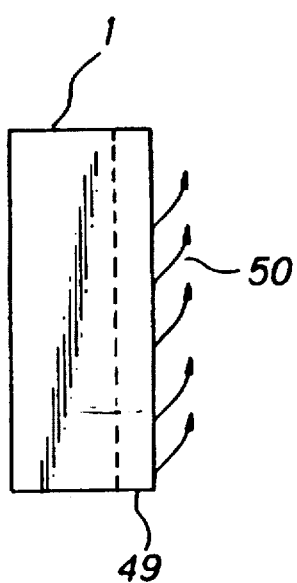
FIG. 19A is a side view showing a situation of heat emission in the case where a heat-radiating fin is installed in an inverter.
Figure 19B:
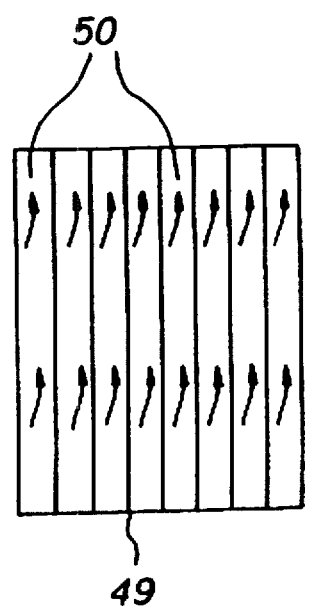
FIG. 19B is a rear view showing the rear view in FIG. 19A.

FIG. 17A is a cross-sectional view showing the terminal block 2 and the I/O device 31 when an external signal (AC power cable 8) is connected to the inverter 1 in the case where the I/O device 31 is connected to the inverter 1, and FIG. 17B is an explanatory view for the current path shown in FIG. 17B.

The current path is then the current path 28 shown in FIG. 17B. Namely, AC power supplied from the AC power cable 8 is supplied via the contact piece 15 of the inverter 1, the conductive pattern of the upper surface 34a of the substrate 33 of the I/O device 31, through-hole 35, and the conductive pattern of the lower surface 34b of the substrate 33 to the I/O device parts 32, and furthermore is supplied via the conductive pattern of the lower surface 34b of the substrate 33, contact piece 16 of the inverter 1, and conductive pattern 17A of the substrate 17 to the inside of the inverter 1.

As described above, in the control unit according to this embodiment, the inverter 1 and the I/O device 31 are connected to each other through the terminal block 2 and are integrated into a single body, so that, as compared to the case of connection with a cable, the space required for installation of the control unit as a whole can substantially be reduced. Also the cost for connection cables and the work required for making connections become unnecessary, and the size of the control unit as a whole is substantially minimized.

Also as a connection cable between the inverter 1 and the I/O device 31 is not required, electromagnetic radiation noise from a connection cable is eliminated. Furthermore, if the cooling construction is the same as that in the first embodiment, heat emission from heat-radiating fins is not impeded as in the conventional approach.

As described above, with the terminal block according to the present invention, in the case where an inverter and an additional device are closely fitted to one another, an external signal for the inverter is delivered via an internal circuit in the additional device to the inside of the inverter, so that the inverter and the additional device are integrated with each other, a connection cable between the two is not required, the effect due to electromagnetic radiation noise by a connection cable is eliminated, and the workability can be improved.

Also in the terminal block according to the present invention, an external device for an inverter is connected via an internal circuit in an additional device connected thereto to the inside of the inverter when the additional device has not been connected to another additional device, and an external device for the inverter is connected via an internal circuit in the other additional device as well as in the connected additional device when the additional device has been attached to another additional device, so that the inverter and an additional device can be integrated with each other, a connection cable between the two is not required, the effect of electromagnetic radiation noise by a connection cable is eliminated, and the workability can be improved.

Also in the terminal block according to the present invention, a noise filter can be used as an additional device, and hence efficient noise filtering can be realized.

Also in the terminal block according to the present invention, an overvoltage protection device can be used as an additional device, so that an inverter is protected from damage by excessive voltage.

Also in the control unit according to the present invention, connection between an inverter and a first additional device is made so that an external signal for the inverter is directly delivered to the inside of the inverter when the first additional device is not connected to the inverter, and an external signal for the inverter is delivered via an internal circuit in the first additional device to the inside of the inverter when the first additional device is connected to the inverter. Also in the control unit according to the present invention, a terminal block is provided in the inverter, connection between the inverter and a first additional device is made by setting a short-circuiting bar to the terminal block, and also the inverter and the first additional device are held closely fitted to one another. In the case where a terminal block of the inverter is a female terminal in which a first pole connected to an external signal for the inverter and a second pole connected to the inside of the inverter are normally kept in the closed state due to elasticity or other means, the connection structure as described above can be realized by setting a short-circuiting bar between the first and second poles in the female terminal against the elasticity when the inverter and the first additional device are connected to each other, so that the inverter and the first additional device can be integrated with each other to eliminate the need for a connection cable between the two. As a result, an additional device added to reduce noise or a leakage current can be attached to the inverter in a smaller space with less work, and in addition it is possible to provide a control unit little affected by electromagnetic radiation noise.

Also in the control unit according to the present invention, connection between an inverter and a first additional device is made so that an external signal for the inverter is directly delivered to the inside of the inverter when the first additional device is not connected to the inverter, and an external signal for the inverter is delivered via an internal circuit in the first additional device to the inside of the inverter when the first additional device is connected to the inverter. Also, in the control unit according to the present invention, a terminal block having a female terminal is provided in the inverter, a male terminal and a female terminal are provided in the first additional device, connection between the inverter and the first additional device is carried out by setting the male terminal of the first additional device into the female terminal of the terminal block, and at the same time the inverter and the first additional device are held closely fitted to one another, so that the inverter and the first additional device can be integrated with each other to eliminate the need for a connection cable between the two. As a result, an additional device added for reducing noise, leakage current and the like can be attached to the inverter in a smaller space with less work, and in addition it is possible to provide a control unit little affected by electromagnetic radiation noise from a connection cable.

Also, with the control unit according to the present invention, connection among the control unit, a first additional device, and a second additional device is made so that an external signal for the inverter is delivered via an internal circuit in the first additional device to the inside of the inverter when the second additional device is not connected to the first additional device, and an external signal for the inverter and/or a signal for the first additional device are delivered via an internal circuit in the second additional device to the inside of the first additional device when the second additional device is connected to the first additional device. Also in the control unit according to the present invention, a male terminal and a female terminal are provided in the second additional device, connection between the first additional device and the second additional device is made by setting the male terminal of the second additional device into the female terminal of the first additional device, and at the same time the first additional device and second additional device are held closely fitted to one another. Thus, the inverter and the first additional device can be integrated with each other to eliminate the need for a connection cable between the two, and as a result an additional device added for reducing noise or a leakage current can be attached to the inverter in a smaller space with less work, and in addition it is possible to provide a control unit little affected by electromagnetic radiation noise from a connection cable.

Also with the control unit according to the present invention, connection among an inverter, an (n−1)-th additional device, n-th additional device, and (n+1)-th additional device is made so that an external signal for the inverter and/or a signal for the (n−1)-th additional device are delivered via an internal circuit in the n-th additional device to the inside of the (n−1)-th additional device when the (n+1)-th additional device is connected to the n-th additional device, and an external signal for the inverter and/or a signal for the (n−1)-th additional device are delivered via internal circuits in the n-th additional device as well a in the (n+1)-th additional device to the inside of the (n−1)-th additional device. Also in the control unit according to the present invention, a male terminal and a female terminal are provided in the n-th additional device, a male terminal and a female terminal are provided in the (n=1)-th additional device, connection between the n-th additional device and (n=1)-th additional device is carried out by setting the female terminal of the (n=1)-th additional device into the male terminal of the n-th additional device, and at the same time the n-th additional device and (n=1) -th additional device are held closely fitted to one another, so that the inverter, (n−1)-th additional device, n-th additional device, and (n=1)-th additional device can be integrated with each other to eliminate the need for a connection cable among the components. As a result, an additional device added for reducing noise or leakage current or the like can be attached to the inverter in a smaller space with less work, and in addition it is possible to provide a control unit little affected by electromagnetic radiation noise from a connection cable.

Also with the control unit according to the present invention, a heat-radiating fin is provided on a surface on which a terminal block of an inverter is not mounted, so that heat emission from the heat-radiating fin will not be prevented by the first additional device, second additional device, and/or the n-th additional device, and as a result it is possible to provide a control unit not affecting the cooling efficiency of the heat-radiating fin.

Also with the control unit according to the present invention, a heat-radiating fin is provided in each of the first additional device, second additional device and/or n-th additional device, so that air flows from the heat-radiating fin from the inverter and from the heat-radiating fins of the first additional device, second additional device and/or n-th additional device will not interfere each other, and also so that heat emission from each heat-radiating fin will not be impeded. As a result it is possible to provide a control unit not affecting the cooling efficiency of the heat-radiating fins.

Also, with the control unit according to the present invention, a noise filter can be used as an additional device, so that efficient noise filtering can be realized.

Also with the control unit according to the present invention, an overvoltage protection device can be used as an additional device, so that the inverter can be protected from damage by excessive voltage.

Although the invention has been described with respect to specific embodiments for a complete and clear disclosure, the appended claims are not to be thus limited but are to be construed as embodying all modifications and alternative constructions that may occur to one skilled in the art which fairly fall within the basic teaching herein set forth.

What is claimed is:

1. A terminal block via which an inverter and an additional device for adding a specific function to said inverter are connected to each other, said terminal block comprising: means for delivering an external signal for said inverter directly to inside said inverter in a case where said inverter is not connected to said additional device, and means for delivering an external signal for said inverter via an internal circuit in said additional device to the inside of said inverter in a case where said inverter is connected to said additional device.

2. A terminal block according to claim 1, wherein said additional device is a noise filter.

3. A terminal block according to claim 1, wherein said additional device is an overvoltage protection device.

4. A terminal block connecting an inverter and a first additional device, said terminal block comprising:

means for delivering an external signal for said inverter via an internal circuit of said connected first additional device to said inverter in a case where said first additional device is not connected to a second additional device; and means for delivering an external signal for said inverter via an internal circuit of said second additional device and the internal circuit of said connected first additional device to said inverter in a case where said first additional device is connected to said second additional device.

5. A terminal block according to claim 4, wherein said first additional device is a noise filter.

6. A terminal block according to claim 4, wherein said first additional device is an overvoltage protection device.

7. A control unit comprising:

an inverter;

a terminal block, said terminal block delivering an external signal for said inverter to said inverter in a case where said inverter is not connected to an additional device, and delivering an external signal for said inverter via an internal circuit in said additional device to said inverter in a case where said inverter is connected to said additional device; and a substrate for connecting said inverter to said additional device via said terminal block.

8. A control unit according to claim 7, wherein said inverter comprises a heat-radiating fin on a surface on which said terminal block is not mounted.

9. A control unit according to claim 8, wherein said additional device comprises a plurality of additional units and at least one of said plurality of additional units have a heat-radiating fin, mounted so that air flow by heat-radiating fins of said inverter, and said plurality of additional units do not interfere with each other.

10. A control unit according to claim 7, wherein said additional device is a noise filter.

11. A control unit according to claim 7, wherein said additional device is an overvoltage protection device.

12. A control unit according to claim 7, wherein said terminal block comprises a female terminal, and said additional device comprises a male terminal and a female terminal, connection between said terminal block and said first additional device being carried out by closely fitting said male terminal of said first additional device to said female terminal of said terminal block of said inverter, and said inverter being closely fitted to said additional device.

13. A control unit according to claim 12, wherein said control unit comprises an n-th additional device connected to a (n−1)-th additional device, and a (n+1)-th additional device connected to said n-th additional device, where n is an integer of 2 or more, and said terminal block delivering at least one of an external signal for said inverter and a signal for said (n−1)-th additional device via an internal circuit in the n-th additional device to inside the (n−1)-th additional device in a case where said n-th additional device is not connected to said (n+1)-th additional device and delivers at least one of an external signal for said inverter and a signal for the (n−1)-th additional device via an internal circuit in said n-th additional device and in said (n+1)-th additional device to inside of the (n−1)-th additional device in a case where said n-th additional device is connected to said (n+1)-th additional device, said n-th additional device comprising a male terminal and a female terminal, said (n+1)-th additional device comprising a male terminal and a female terminal, connection between said n-th additional device and said (n+1)-th additional device being carried out by fitting said male terminal of said (n+1)-th additional device to said female terminal of said n-th additional device, and said n-th additional device and said (n+1)-th additional device being closely fitted to one another.

14. A control unit according to claim 12, wherein said inverter comprises a heat-radiating fin on a surface on which said terminal block is not mounted.

15. A control unit according to claim 14, wherein said additional device comprises a plurality of additional units comprising a heat-radiating fin, said heat-radiating fin being mounted so that an air flow by said heat-radiating fin of said inverter and an air flow by said heat-radiating fin of said plurality of additional units do not interfere with each other.

16. A control unit according to claim 12, wherein said additional device is a noise filter.

17. A control unit according to claim 12, wherein said additional device is an overvoltage protection device.

18. A control unit according to claim 12, wherein said additional device is a first additional device and said control unit comprises a second additional device, and said terminal block delivers an external signal for said inverter via an internal circuit in said first additional device to said inverter in a case where said first additional device is not connected to said second additional device, and delivers at least one of an external signal for said inverter and a signal for said first additional device via an internal circuit in said second additional device to said first additional device in a case where said first additional device is connected to said second additional device, said second additional device comprising a male terminal and a female terminal, connection between said first additional device and said second additional device being carried out by fitting said male terminal of said second additional device to said female terminal of said first additional device, and said first additional device and said second additional device being in a closely fitted state.

19. A control unit according to claim 18, wherein said inverter comprises a heat-radiating fin on a surface on which said terminal block is not mounted.

20. A control unit according to claim 19, wherein at least one of said additional device, said second additional device and an n-th additional device comprises a heat-radiating fin mounted so that an air flow by said heat-radiating fin of said inverter and an air flow by said heat-radiating fin of said first additional device, said second additional device and said n-th additional device do not interfere with each other.

21. A control unit according to claim 18, wherein said additional device is a noise filter.

22. A control unit according to any of claim 18, wherein said additional device is an overvoltage protection device.

23. A control unit according to claim 18, wherein said control unit comprises an n-th additional device, an (n−1)-th additional device, and a (n+1)-th additional device, where n is an integer of 2 or more, and said terminal block delivers at least one of an external signal for said inverter and a signal for said (n−1)-th additional device via an internal circuit in the n-th additional device to the (n−1)-th additional device in a case where said n-th additional device is not connected to said (n+1)-th additional device and delivers at least one of an external signal for said inverter and a signal for the (n−1)-th additional device via an internal circuit in said n-th additional device and in said (n+1)-th additional device to said (n−1)-th additional device in a case where said n-th additional device is connected to said (n+1)-th additional device, said n-th additional device comprising a male terminal and a female terminal, said (n+1)-th additional device comprising a male terminal and a female terminal, connection between said n-th additional device and said (n+1)-th additional device being carried out by fitting said male terminal of said (n+1)-th additional device to said female terminal of said n-th additional device, and said n-th additional device and said (n+1)-th additional device being closely fitted to one another.

24. A control unit according to claim 23, wherein said inverter comprises a heat-radiating fin on a surface on which said terminal block is not mounted.

25. A control unit according to claim 24, wherein at least one of said additional device, said second additional device and said n-th additional device comprises a heat-radiating fin mounted so that an air flow by said heat-radiating fin of said inverter and an air flow by said heat-radiating fin of said first additional device, said second additional device and said n-th additional device do not interfere with each other.

26. A control unit according to claim 23, wherein one of said first additional device, said second additional device, said n-th additional device, said (n+1)-th additional device and said (n−1)-th additional device is a noise filter.

27. A control unit according to claim 23, wherein one of said first additional device, said second additional device, said n-th additional device, said (n+1)-th additional device and said (n−1)-th additional device is an overvoltage protection device.

* * * * *